Sept. 25, 1951  R. P. KIPP  2,568,961
SHEET MATERIAL CUTTING DEVICE
Filed Oct. 6, 1949  3 Sheets-Sheet 1
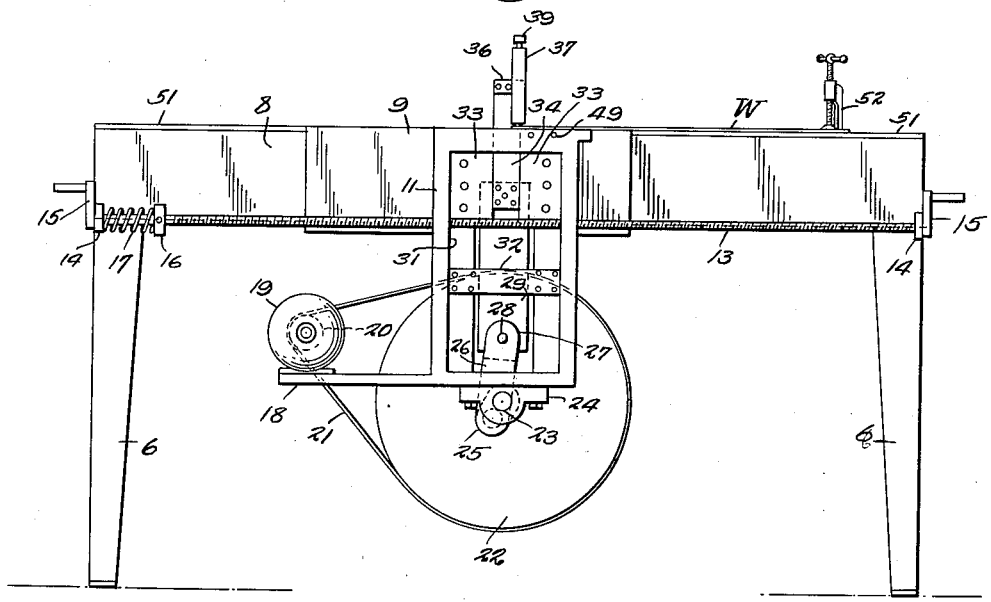
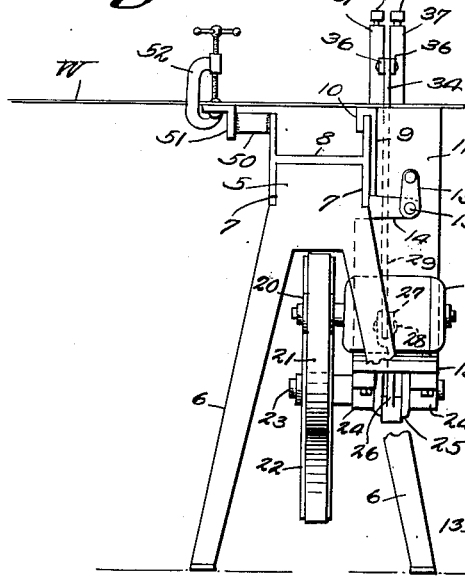
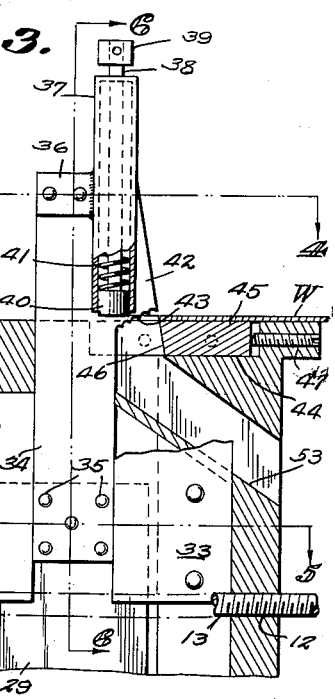
R. P. Kipp
INVENTOR
BY C. A. Snow & Co.
ATTORNEYS.

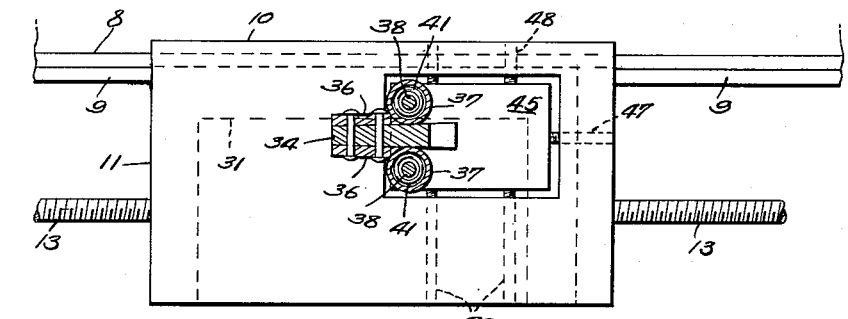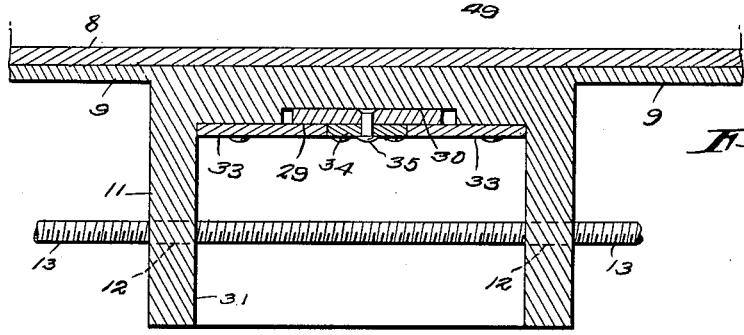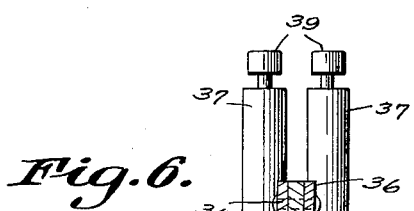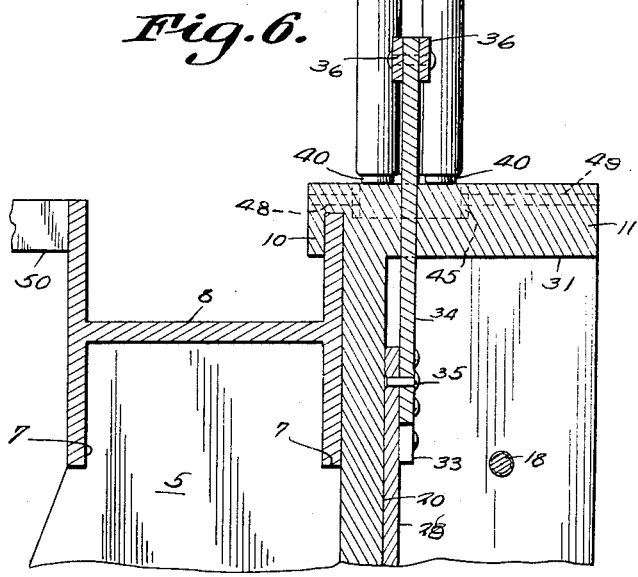

Sept. 25, 1951 R. P. KIPP 2,568,961
SHEET MATERIAL CUTTING DEVICE
Filed Oct. 6, 1949 3 Sheets—Sheet 3
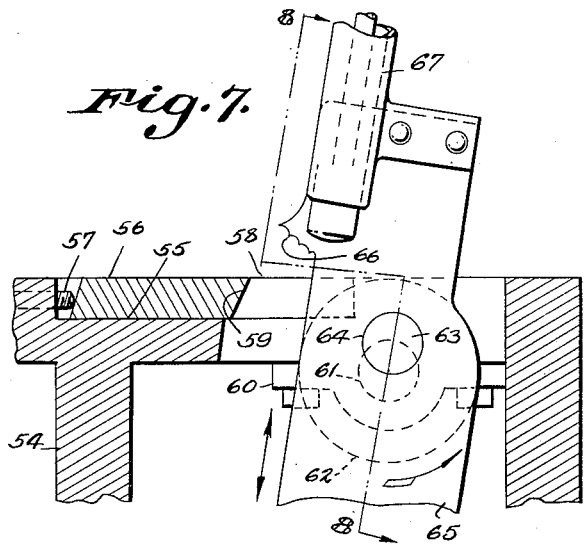
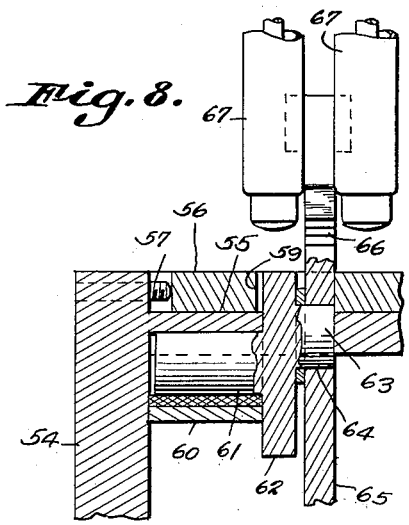
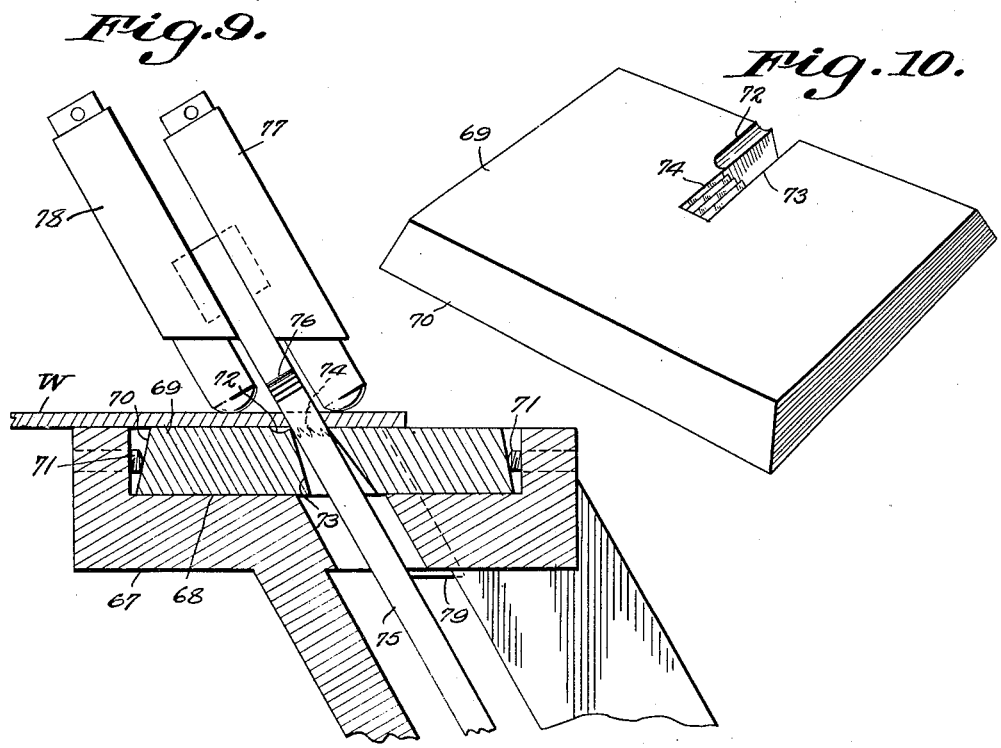
R. P. Kipp
INVENTOR
BY
ATTORNEYS.

Patented Sept. 25, 1951

2,568,961

UNITED STATES PATENT OFFICE 2,568,961

SHEET MATERIAL CUTTING DEVICE

Ralph P. Kipp, Ossining, N. Y.

Application October 6, 1949, Serial No. 119,794

1 Claim. (Cl. 164—75)

This invention relates to a machine for shearing or slitting sheet material, particularly sheet metals.

Important objects of the invention are to provide a machine of the character described that will shear metal sheets of any size without limitation as to length, width, angle, thickness, or type of metal; will discharge its shearing function with little or no bending or other distortion of the work; will sheer said sheets or plates accurately to line, with facility, and with the expending of power reduced to a minimum; will permit the positioning and feeding of the work speedily and with ease, with the power means for the shearing mechanism being disposed wholly below the table height; will permit the work either to be clamped immovably during the operation, as is desirable when the sheet is large, or to be moved by hand as is desirable when the sheet is small; and that will, in general, be durable, simple in construction and operation, fully portable, and relatively inexpensive.

Summarized briefly, the invention includes a supporting frame; a shear frame or carriage that traverses said frame; a power means mounted upon the lower portion of the shear frame; a cutting knife mounted upon the upper end of the shear frame; an operative linkage between the power means and knife for actuating the knife to shear or slit a piece of work supported stationarily upon the supporting frame; and a hold-down means mounted upon the upper end of the knife and engaging the work on each contact of the work by the cutting knife.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Fig. 1 is a front elevation of the machine.

Fig. 2 is an end elevation of the machine as viewed from the left of Fig. 1.

Fig. 3 is an enlarged vertical section through the upper portion of the shear carriage.

Fig. 4 is a section on line 4—4 of Fig. 3.

Fig. 5 is a section on line 5—5 of Fig. 3.

Fig. 6 is a section on line 6—6 of Fig. 3.

Fig. 7 is a vertical section through the upper portion of a modified shear carriage construction.

Fig. 8 is a section on line 8—8 of Fig. 7.

Fig. 9 is a vertical section taken transversely through the upper portion of another shear carriage modification.

Fig. 10 is a perspective view of the die used with the carriage of Fig. 9.

Referring to the drawings in detail, I provide a supporting frame that includes the end plates 5 integral with the supporting legs 6, said end plates having the side recesses 7 (Fig. 2) receiving the ends of the slideway 8 of H-shaped cross-sectional configuration.

Mounted for sliding movement upon the supporting frame described above is the shear carriage, that includes an elongated plate 9, the upper edge of which is formed with a flange 10 overlying and slidable along side of the slideway 8, to permit traversing of the supporting frame by the shear frame 11 rigidly connected to the plate 9 in any suitable manner. In the opposite side walls of the shear frame 11 are formed the aligned threaded openings 12 (Fig. 3) through which extends the elongated traverse screw 13 which, as best shown in Fig. 1, extends the length of the supporting frame and has its opposite ends journaled in ears 14 mounted upon and extending laterally from the end portions of the supporting frame. For rotating the traverse screw, I provide the cranks 15 at opposite ends thereof, and to allow for a steady operation of the screw when the cutting knife (to be described) is in its return stroke, there is provided the spring 17 abutting at opposite ends against one of the ears 14 and against a collar 16 carried by the screw.

As best seen from Fig. 1, the lower end of the shear frame is integral or otherwise rigid with a laterally extended platform 18 supporting the motor 19 on the shaft of which is the small pulley 20 around which passes the belt 21 that also passes around the large pulley 22 rotatable with the shaft 23 journaled in spaced bearings 24 secured to the underside of the shear frame. A crank 25 is rotatable with the shaft 23 between the bearings 24 and secured to and connected to the crank is a pitman 26 (Fig. 1) extending upwardly within the shear frame and having at its upper end a yoke 27 pivotally connected by a pin 28 to a blade holder or cross head 29 vertically reciprocable in a shallow depression 30 formed in the inner wall of the hollow interior 31 of the shear frame 11. Guiding the blade holder in its travel are a cross bar 32 (Fig. 1) overlying the depression 30, and plates 33 (Fig. 3) which, like the cross bar 32, are riveted or otherwise fixedly mounted upon the inner wall of the shear frame, The plates 33 are spaced apart to provide a guideway for vertical reciprocation of the blade or knife 34 (Fig. 6) secured by rivets 35 to the holder 29.

The upper portion of the blade 34 projects above the upper surface of the carriage and secured to opposite faces of the upper end of the blade are the ears 36 having rigidly secured as by welding or the like, hold-down means comprising a pair of tubes 37 disposed at opposite sides of the blade, said tubes having slidably mounted therein the rods 38 the upper ends of which project above the tubes 37 and are provided with stop collars 39. Formed on the lower end of each rod 38 is a foot 40 and surrounding the rods and urging them against the work W are the springs 41.

The knife or blade is provided with a cutting head 42 formed with a serrated shear edge 43 that is related obliquely to the work to be sheared thereby.

I form in the upper surface or table portion of the shear carriage a die-receiving recess 44 in which is removably positioned a die 45 having the die slot 46 into which the shear edge 43 moves during its down stroke. The die 45 is held in position by set screws 47, 48, and 49 threaded through the side walls of the carriage and against the side surfaces of the die.

For the purpose of holding the work W immovably upon the supporting frame, I provide the laterally extended brackets 50 welded or otherwise rigidly secured to the opposite side of the track or slideway 8 and these are rigid with an elongated flange 51 extending the length of the supporting frame and disposed parallel to said frame. The flange 51 supports a sheet W to be sheared (Fig. 2) which is clamped immovably to the flange by C-clamps 52. As the work is sheared, chips drop through a chip chute 53 (Fig. 3) formed in the shear frame 11.

From what has been described, it is seen that the work W is first clamped in proper position to be sheared along a previously marked line. The motor 19 is then set in operation to reciprocate the knife vertically, and by means of either hand crank 15, the operator traverses the shear carriage from end to end of the supporting frame to shear the sheet along the desired line. In this connection, the characteristics of the machine during the operation are of importance to note. On each down stroke of the cutting knife, the feet 40 of the hold-downs first engage the work on either side of the cutting blade, before the shear edge 43 of the blade itself contacts the work. As the shear edge begins to cut through the work, the work is held firmly in position by the feet 40 and as the down-stroke continues the springs 41 exert more and more pressure against the work's surface. On the up-stroke of the blade the hold-downs lighten their pressure against the work.

In operation of the machine, I have found that it produces long very narrow slits with little waste; shears fast and straight at any speed; by reason of its blade formation, prevents the work from "backing away" from the blade, and acts to extend the blade stroke, thus to reduce greatly strain upon the machine, and to prevent distortion of the material sheared.

Referring now to Figs. 7 and 8, I have here illustrated a modified shear mechanism wherein a shear frame 54 is mounted for sliding movement upon the trackway in the same manner as the shear frame 11. The shear frame 54 has a die recess 55 in which is removably positioned the die 56 held in a selected position by set screws 57 threadable through the shear frame against the several side surfaces of the die. A slot 58 is formed in the die this having a beveled inner wall 59 to clear chips during the cutting.

In the form of Figs. 7 and 8, the blade movement is through a circular path rather than straight line vertical reciprocation. Accordingly, I provide a bearing 60 mounted below the upper surface of the shear frame and journaled in the bearing is a stub shaft 61 integral with disc 62 on which is the eccentric pin 63 extending into opening 64 formed in the blade 65 having the serrated oblique shear edge 66 adjacent which is the hold-down 67 secured to the upper end of the blade. The shear edge 66 as will be seen, travels in a circular path while maintained at a prescribed angle (generally 16 to 20 degrees) to the horizontally disposed work to be sheared.

Referring to Figs. 9 and 10, in these figures I have illustrated a shear mechanism construction which is specially designed to shear the work in a manner to provide a beveled edge thereon. This is desirable, in instances where plates are to be welded to each other, since the beveled edges thereof cooperate to define a cavity to be filled by the weld.

Accordingly, a shear frame 67 is mounted for sliding movement upon the trackway of the supporting frame, and this has a die recess 68 in which is seated the die 69 (Fig. 10) having the beveled side walls 70 engaged by set screws 71 threaded in the shear frame. The die has a die groove 72 adjacent which is the die slot 73. Die teeth 74 are adapted to engage the underside of the work to further insure against slippage.

As seen from Fig. 9, the die slot 73 is inclined from the vertical and has upwardly converging side walls spaced apart at their upper ends just sufficient to permit sliding therebetween of the knife 75 also disposed obliquely to the perpendicular so as to cut a beveled edge upon the work during the shearing operation. Hold-downs 77, 78 are secured to the upper end of the blade and are parallel thereto. A gib wear plate 79 is mounted in the frame adjacent the die.

What is claimed is:

In a shearing machine for cutting metal sheets a supporting frame proportioned to support horizontally a sheet of material to be cut; a shear carriage slidably mounted on the frame and disposed wholly below the plane of the supported sheet, the top surface of said carriage being at an elevation to contact slidably the underside of the supported sheet; a knife blade mounted upon the shear carriage for up and down movement, the upper portion of the blade projecting above the plane of the supported sheet and having a leading edge formed with a cutting surface oblique to said supported sheet and passing through the plane of the sheet on up and down movement of the knife blade; a power means mounted upon said shear carriage; an operative linkage between said power means and the lower portion of the knife for imparting said up and down movement to the knife blade; guide tubes rigidly secured to the upper portion of the knife blade at opposite sides of said cutting surface and shiftable bodily upwardly and downwardly with said knife blade; rods mounted to slide upwardly and downwardly within and relative to said tubes, said rods having work-engaging feet on the lower ends thereof; and compression springs within the tubes and surrounding the rods, said springs abutting at one end against said feet and at the other end against one end of the tubes, said springs being adapted to urge the rods yieldably against the work, said feet in the up position of the knife blade being urged outwardly of the tubes by the springs to contact the supported sheet in advance of contact of the sheet by the cutting surface when the blade makes its down stroke, said springs being increasingly compressed on said down stroke to increase correspondingly the pressure of the feet against the work during the down stroke.

RALPH P. KIPP.

REFERENCES CITED

The following references are of record in the file of this patent:

UNITED STATES PATENTS

| Number | Name | Date |
|---|---|---|
| 682,803 | Maldeis | Sept. 17, 1901 |
| 1,103,364 | Laub | July 14, 1914 |
| 2,252,112 | Bailey | Aug. 12, 1941 |
| 2,372,784 | Jansen et al. | Apr. 3, 1945 |